United States Patent
Helmsderfer et al.

[11] Patent Number: 5,341,830
[45] Date of Patent: Aug. 30, 1994

[54] COVER ASSEMBLY AND METHOD FOR COVERING UNDERSINK PIPING

[75] Inventors: John A. Helmsderfer, Cincinnati, Ohio; T. Michael McRoberts, Glastonbury, Conn.

[73] Assignee: Brocar Products, Inc., Cincinnati, Ohio

[21] Appl. No.: 146,999

[22] Filed: Oct. 29, 1993

[51] Int. Cl.$^5$ ............................ F16L 7/00; F16L 9/22
[52] U.S. Cl. ............................ 137/15; 137/247.49; 137/375; 137/797; 285/47; 138/157; 138/161; 138/178
[58] Field of Search .................... 137/247.49, 375, 797, 137/15; 138/155, 157, 158, 161, 178; 285/45, 47

[56] References Cited

U.S. PATENT DOCUMENTS

| | | | |
|---|---|---|---|
| 2,140,308 | 12/1938 | Belshaw | 285/47 X |
| 2,650,180 | 8/1953 | Walker | 137/375 |
| 2,761,949 | 9/1956 | Colton | 285/47 X |
| 2,937,662 | 5/1960 | Green | 285/47 |
| 3,019,827 | 12/1961 | Clinchy et al. | 138/161 |
| 3,153,546 | 10/1964 | Dunn | 285/47 X |
| 3,559,694 | 2/1971 | Volberg | 285/47 X |
| 3,598,157 | 8/1971 | Farr et al. | 138/157 |
| 3,960,181 | 6/1976 | Baur et al. | 138/178 |
| 4,463,780 | 8/1984 | Schultz et al. | 138/178 |
| 4,473,244 | 9/1984 | Hill | 137/375 X |
| 4,516,278 | 5/1985 | Lamond | 4/679 |
| 4,595,615 | 6/1986 | Cohen | 138/155 X |
| 4,667,505 | 5/1987 | Sharp | 138/161 X |
| 4,669,509 | 6/1987 | Botsolas | 138/178 |
| 4,705,302 | 11/1987 | Beiley | 285/47 |
| 4,746,147 | 5/1988 | Walker | 285/47 X |
| 4,804,210 | 2/1989 | Hancock | 285/47 |
| 4,840,201 | 6/1989 | Botsolas | 138/178 |
| 5,054,513 | 10/1991 | Trueb et al. | 137/375 |
| 5,055,334 | 10/1991 | Lechuga | 137/375 X |
| 5,163,469 | 11/1992 | Trueb et al. | 137/375 |
| 5,183,299 | 2/1993 | Hallerstrom et al. | 285/47 |
| 5,259,410 | 11/1993 | Trueb et al. | 137/375 |

FOREIGN PATENT DOCUMENTS 1249974 2/1989 Canada.

*Primary Examiner*—John Rivell
*Attorney, Agent, or Firm*—Wood, Herron & Evans

[57] ABSTRACT

A cover assembly for undersink piping is presented having cover pieces for the various piping sections of an undersink P-trap drain assembly. The pieces are configured to cover the various pipe sections of the P-trap and have integral, flexible collars at the ends thereof which overlap the junctures and fastening mechanisms between the different pipe sections. The invention further includes a cover piece for an offset grid drain which is used with a P-trap having a longitudinal slit, a flexible collar on one end, and a band which is placed over the slit cover piece and moved up along the cover piece to hold the slit piece together while the flexible collar is folded downwardly to cover the pipe juncture between the offset grid drain and a P-trap. In one embodiment, the band is removably attached to the integral cover. Finally, the invention includes a cover piece to cover a supply line and valve of a water supply angle valve with the cover piece being longitudinally slit thereon and having a projection perpendicular the valve covering portion of the piece. A second piece extends over a faucet line has a flexible collar at one end thereof to overlie the perpendicular projection and hold the first piece closed partially along the slit when two pieces are assembled together around a supply water angle valve. The invention provides a cover assembly which is simple to use, requiring minimal tools or external fastening structures, and which is aesthetically pleasing while adequately insulating the and covering undersink piping to prevent burns and abrasions and reduce the accumulation of dirt and bacteria around the piping.

51 Claims, 3 Drawing Sheets

COVER ASSEMBLY AND METHOD FOR COVERING UNDERSINK PIPING

FIELD OF THE INVENTION

This invention relates generally to undersink piping such as P-trap drains and water supply piping and specifically discloses an assembly and method to cover the undersink piping to insulate the piping and to protect a person coming into contact with the piping from abrasions and burns.

BACKGROUND OF THE INVENTION

Conventionally, water which drains from a sink or basin, such as a restroom sink, travels through the drain opening of the sink and empties into undersink piping which directs the water from the sink into the building's waste water system. The undersink drain piping is referred to as a "P-trap" drain and "P-trap" assemblies are common to many sinks, both commercial and residential. The P-trap piping assembly includes vertical pipe section which extends downwardly from the sink drain opening and below the sink to a J-shaped pipe section. The J-shaped pipe section makes a 180° bend and then extends vertically upward to connect to an L-shaped pipe piece which makes a 90° bend from the J-shaped piece to extend generally horizontally into the wall to connect the P-trap with the waste water system of the building. The J-shaped portion serves the purpose of capturing or trapping any foreign objects which fall down the drain and which may become lodged in the waste water drainage system therefore clogging the system, hence the name "P-trap". Under the force of gravity, any foreign objects will sit in the bottom of the J-shaped section to be subsequently removed, such as by a plumber. Also extending below sinks are hot and cold water supply pipes commonly referred to as supply water angle valves, which include supply line sections connected to a water supply that extend generally horizontally from the wall to connect to a valve and faucet line sections that extend generally vertically upward from the valve to connect to the sink faucet.

Current regulations require that restroom facilities in a public building, such as restroom sinks, be accessible to all people, including disabled persons. Disabled persons, such as persons in wheelchairs, must often maneuver the chair partially under the sink to access it. Since the water supply pipes and P-trap drain pipes protrude from the wall there is a risk of abrasions from the hard piping or even burns from the temperature of the water and piping to the legs of a person confined to a wheelchair. The current federal and state regulations regarding undersink piping, most notably the Americans With Disabilities Act (ADA), require that the P-trap and water supply piping be covered and insulated so as to protect a person using the sink from being burned or from incurring injuries from impact with the piping. As a result of these regulations, various methods and apparatuses have been utilized to try and adequately cover and insulate undersink P-traps and water supply piping. In the past, one of the more popular methods of insulation was to utilize loose foam insulation which was wrapped around the piping. However, traditional foam insulation usually fit poorly and was difficult to secure resulting in wasted time and frustration by the plumber or other installer. Furthermore, the foam wrap, due to its poor fit and inadequate securing means, was not very aesthetically pleasing in its appearance. Additionally, the ribbed construction of a wrapped pipe leaves ridges and cavities which trap dirt and other bacteria under the sink.

Various other methods and apparatuses have been utilized to cover a P-trap and supply piping beneath a sink as is evidenced by various patents in the field. However, besides often being ineffective, many of these other devices and methods are still difficult and time consuming to secure and use, requiring various fasteners and other securing means to hold the insulation and coverings to the piping. For example, additionally, various existing undersink pipe coverings utilize lengthwise axial slits on all of the different cover pieces to fit them over the piping which require external fasteners to hold the slit pieces together. Further, existing coverings include various ridges on the pieces, which have a tendency to trap dirt and other bacteria around the coverings and pipes. Still further, some of the various currently available cover devices do not present a pleasant appearance when installed.

Accordingly, there is still a need for a simple and sanitary P-trap and supply pipe cover assembly and method which addresses the shortcoming of the existing devices and methods. It is therefore an object of the present invention to provide such a cover assembly and method which addresses the shortcomings of prior devices and is still effective to prevent a disabled person from being burned or bruised and cut by the piping when using a sink.

SUMMARY OF THE INVENTION

The present invention accomplishes the desired results as discussed hereinabove by presenting an improved cover assembly for the P-trap drainage and supply pipes located under a sink which is relatively inexpensive and simple to manufacture, which is simple to install in a very short time requiring little or no external fasteners, which is adequately secured to the piping when installed and effective to prevent abrasions and burns, and is aesthetically pleasing in appearance with a smooth, outer surface having minimal cavities or openings that might trap dirt and other bacteria. More specifically, the invention comprises a novel assembly of separate pipe-covering pieces which are configured to fit over the endurance pipe sections of undersink P-trap drains and hot/cold water supply piping. The pieces of the invention cooperate one with the other in a unique and novel way to adequately cover and insulate the associated piping.

To that end, the invention includes a P-trap cover assembly comprises a generally straight insulative piece which is configured to cover the generally straight pipe section extending downwardly from the sink drain opening to the J-shaped section of a P-trap. A second insulative piece is generally J-shaped and configured to cover the J-shaped trap section of the P-trap. A third piece is L-shaped and configured to cover the generally L-shaped pipe section which extends from one end of the J-shaped pipe section back to the wall of the building to connect the drain to the building's waste water or sewerage lines.

At one end of the straight insulative piece an integral, flexible collar which is folded back on the straight piece when the invention is installed on a P-trap assembly. Similarly, the L-shaped piece has an integral flexible collar at the end of the small section of the piece forming the L, which is also folded back during installation.

The J-shaped piece has integral, flexible collars at both ends thereof. When the cover assembly of the invention are installed on conventional P-trap drain piping, the straight and L-shaped pieces are placed over their respective pipe sections while the J-shaped cover piece is placed on the J-shaped trap section. The flexible collars of all three pieces are simultaneously folded back from the ends of the cover pieces along the bodies of the pieces. The foldback collars allow a plumber or other installer access to the securing mechanisms, such as conventional pipe nuts, which connect the pipe sections together. When the pipe sections have been fastened together at each juncture into a complete P-trap drain, the flexible collars of the J-shaped piece are folded upwardly to cover the nuts or other pipe securing mechanisms at the juncture. This provides complete covering of the drain pipes at the pipe junctures so that the transition of the cover between the three P-trap pipe sections continuous.

Next, to further provide continuous coverage and to prevent dirt and bacteria from being collected in the upturned collars of the J-shaped pieces, the collars from both the L-shaped portion and the straight portion are folded downward along the respective pieces to overlap the flexible collars of the J-shaped piece and provide double insulation coverage of the securing nuts and pipe junctures. When completed, the assembly provides a complete insulative and protective covering for the P-trap drain pipe sections to protect the pipe sections and to prevent burns and abrasions to a person, such as someone with a disability, who might contact the P-trap.

The flexible collars allow quick and easy assembly and use of the invention by exposing the pipe junctures and the pipe nuts for further manipulation in completing the P-trap drain assembly. Since the flexible collars are rolled back to expose the junctures while the cover pieces are in position on the pipe sections, the cover pieces do not have to be forced or moved in various directions to assemble the pipe sections. Nor do the pipe sections have to first be assembled into a complete P-trap and the insulative cover pieces subsequently placed thereon as is necessary with many of the current devices. This amounts to a substantial savings in time when applying the invention and assembling a P-trap drain. Furthermore, since the flexible collars allow the individual cover pieces of the invention to be applied to the respective pipe sections prior to assembly of the P-trap, the cover sections require little or no additional securement to the pipe sections after installation. For example, in one embodiment of the invention, the L-shaped and straight cover pieces are essentially whole, tubular pieces which, because of the flexible collars, may be slid over the straight and L-shaped pipe sections prior to assembly of the P-trap. Once installed and the collars folded down, the straight and L-shaped cover pieces completely cover their respective pipe sections and are secure thereon without need for additional securing mechanisms.

In one embodiment, the J-shaped cover piece may be separately molded dipped onto the pipe section negating the need to slip a cover piece over the J-shaped section. When a separate J-shaped cover piece is utilized, the piece preferably has slits extending partially therealong from both ends, generally through the flexible collars, and towards the curved portion of the J-shaped cover piece. This allows the collar and a portion of the J-shaped piece at both ends to be spread apart while the collar is folded back during installation so that the cover may be more easily placed over the corresponding pipe section. Once the P-trap has been assembled and all of the cover pieces installed with the flexible collars rolled down to cover the pipe nuts and junctures, the overlapping collars from the straight and L-shaped cover pieces cover a portion of the slit to hold the J-shaped cover piece in place and the collars of the J-shaped piece securely wrapped around the pipe section as well as to close the slit thus preventing dirt or bacteria from being trapped.

The outside surfaces of the cover pieces are smooth such that when the invention is completely assembled over a P-trap, it is aesthetically pleasing in appearance giving the impression of a single, continuous cover. The invention has minimal cavities or openings in the smooth exposed outer surface, therefore reducing the possibility that dirt or other bacteria might be trapped in and around the cover and P-trap.

As the invention is used to comply with various federal and state regulations regarding the coverage of undersink piping which is accessible to disabled persons, it is quite possible that a person using the invention will encounter a P-trap piping assembly under a sink containing an offset drain. An offset grid drain fits between a sink drain and a conventional P-trap and is utilized under sinks specifically designed for persons with disabilities to move the P-trap piping assembly rearwardly away from the front of the sink and toward the wall thus allowing greater space under the sink. Therefore, the present invention includes a cover piece configured to fit over an offset grid drain.

The offset grid drain cover piece has a body with a longitudinal slit thereon which extends from an opening at one end of the cover piece partially along the piece. The cover piece is spread apart at the slit to place the piece over an offset grid drain. Integral with the one end of the cover body, is a flexible collar which may be folded back along the cover piece during installation. A detachable band is removably fixed to the collar and may be severed therefrom to aid in securing the cover to the offset grid drain. Specifically, the cover piece is spread at the slit and is placed over the offset grid drain, and the detachable band and flexible collar are the folded back partially along the length of the cover piece. The straight pipe section of the P-trap drain is then secured to one end of the offset grid drain. The band is next severed from the collar and moved along the cover piece to encircle the cover body and extend across a portion of the longitudinal slit. This holds the cover body together along the slit and secures the cover to the grid drain. Alternatively, the band might be formed as a separate piece and slid over the cover body independent of the flexible collar. The flexible collar is then folded down to extend over the pipe juncture between the P-trap straight section and grid drain to provide continuous coverage of the piping. This can be accomplished in a very short amount of time and does not require any external fasteners. Further, the offset grid drain cover also has a smooth outer surface which is aesthetically pleasing and has minimal cavities or openings for trapping dirt and other bacteria.

Finally, the present invention includes a cover assembly for covering undersink hot and cold water supply piping. The supply piping cover assembly includes a first piece which is configured to extend over the supply line and valve. The first piece has a portion of one diameter to cover the supply line and a portion of a larger diameter to cover the attached valve. Extending generally perpendicular to the valve portion is a vertical projection. A longitudinal slit extends from one end of the first piece up to and including one wall of the perpendicular projection. The first piece is spread along the slit and slipped over the supply line and the valve with the projection extending generally vertically upward from the valve. An opening in the other end of the first piece adjacent the valve portion allows a valve stem to stick out to receive a valve handle for opening and closing the water supply valve. A second piece of the water supply cover surrounds the vertically extending faucet line which extends between the faucet and water valve and supply line. The second piece is slid up over the faucet line and has a flexible collar at the lower end which is folded back along the second piece during installation. After the faucet line is fixed to the valve, the flexible collar is folded down to extend over the vertical projection on the valve portion of the first piece to cover the projection. This provides complete covering of the juncture between the supply line and valve and the faucet line. Further, since the flexible collar extends over and completely surrounds the projection, a portion of which is slit, the first piece is secured into place because the collar on the second piece holds the slit projection and first piece together. Additionally, one or more external fastening bands might be utilized around the first piece to hold the piece together at the slit.

As a result, the present invention provides a P-trap and water supply covering assembly which is relatively inexpensive and simple to manufacture. Furthermore, the cover assembly is simple to install in a very short time requiring little or no external fasteners and no special tools. The cover adequately covers the exposed undersink piping and is effective to prevent abrasions and burns, particularly with persons in a wheelchair who may find their legs beneath the sink. The invention is aesthetically pleasing when installed having a smooth, outer surface with minimal cavities or other openings that might trap or accumulate dirt and other bacteria under the sink. Further advantages of the present invention will become apparent from the detailed description of the invention given below.

DETAILED DESCRIPTION OF THE DRAWINGS

Figure 1:
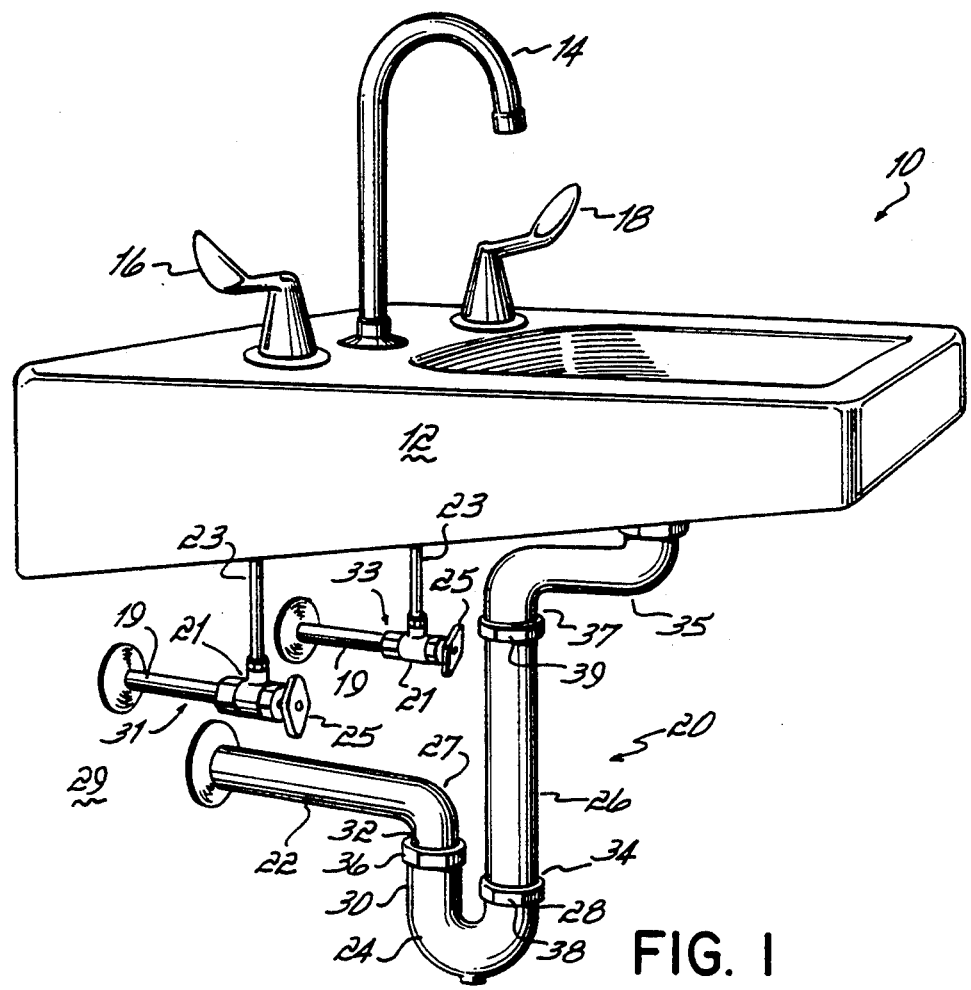
FIG. 1 is a front perspective view of a sink and piping assembly on which the present invention is used.

FIG. 1 shows a conventional sink assembly 10 which might be utilized in public facilities and which, therefore, must comply with various federal, state and local ordinances regarding accessibility by disabled persons and covering of undersink piping, notably the Americans With Disabilities Act (ADA). Assembly 10 shows a sink basin 12, a faucet spout 14, and faucet valve handles 16 and 18 for directing hot and cold water, respectively, through faucet spout 14 and into basin 12. Beneath the sink are located various pipe assemblies for supplying water to the faucet 14 and draining water from the sink basin 12. Specifically, a traditional P-trap pipe assembly 20 is shown comprising an L-shaped pipe section 22, a 180° bend pipe on or J-shaped pipe section 24 and a straight pipe section 26. The straight pipe on 26 extends downwardly from a sink basin drain opening (not shown) carrying waste water from the sink basin 12 to the J-shaped trap section 24. The straight section 26 connects with a vertical front portion 28 of the J-shaped trap section 24. Water flowing through the J-shaped section 24 travels up the vertical rear portion 30 of J-shaped section 24 and into L-shaped section 22 which is connected to the waste water system (not shown) within the internal plumbing of the structure behind wall 29. The J-shaped trap section 24 traps solid objects which may have fallen down the drain opening. While the straight section 26 extends generally vertically, the transitional curve 27 of the L-shaped section 22 orients that section to extend generally horizontally with respect to a floor surface.

The conventional P-trap pipe assembly 20 in FIG. 1 is shown connected to an offset grid drain 35 which is often used with handicap accessible sinks. The offset grid drain 35 connects between the sink drain and the straight pipe section 26 of the P-trap. The drain 35 extends rearwardly from the front of basin 12 to effectively move the P-trap piping assembly 20 rearwardly away from the front of sink and out of the way of a person in a wheelchair.

Hot and cold water are supplied to faucet 14 by way of the hot and cold water supply pipe and valve assemblies, or water angle valves as they are commonly known, 31 and 33, as will be described further hereinbelow.

The various piping sections 22, 24, 26 and 35 are connected together at junctures 32, 34, and 37 utilizing fastening structures such as conventional pipe fastening nuts 36, 38, and 39. For example, nut 38 secured to straight section 26 might be screwed onto a threaded end of the J-shaped section 24 until sections 26 and 24 are held together at juncture 32 in a watertight seal (See FIG. 4). Alternatively other securing structures or methods might be used as will be recognized by a person of ordinary skill in the art. Sections 22 and 24 might be similarly fastened together using nut 36 over a threaded end on the rear portion 30 of J-shaped section 24 and sections 26 and 35 secured together in a like manner using nut 39. Alternatively, an offset grid drain 35 might not be used and the P-trap drain assembly would then be directly connected to the drain opening (not shown) of basin 12 (See FIG. 2).

Figure 2:
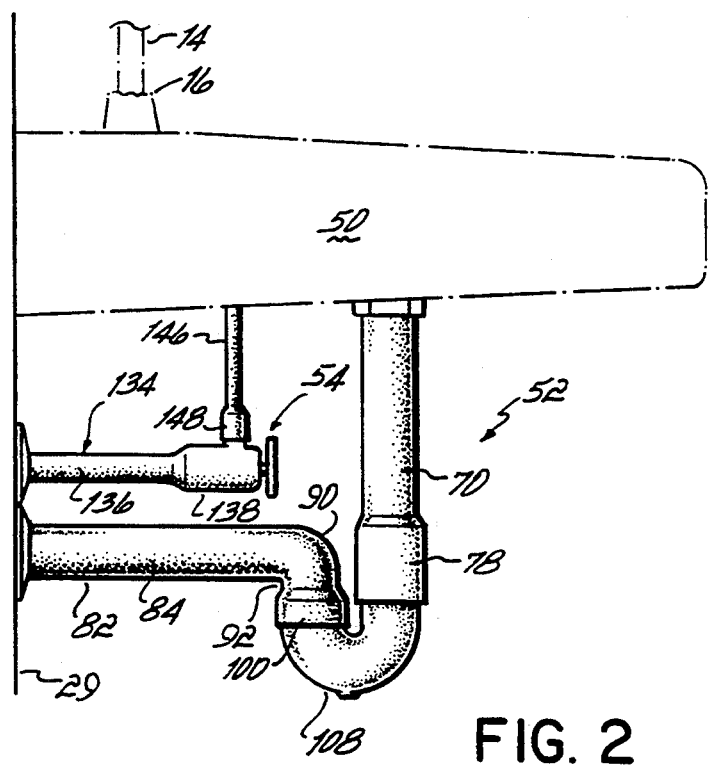
FIG. 2 is a side perspective view of a sink assembly with the undersink piping covered by the present invention.
Figure 3:
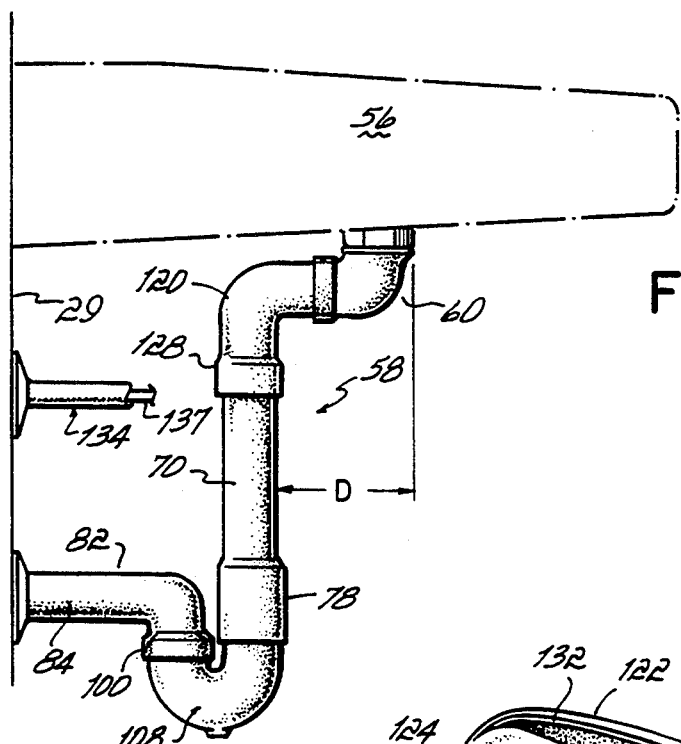
FIG. 3 is a side view of a sink assembly with the undersink piping including an offset grid drain covered by the present invention.

FIGS. 2 and 3 show the cover of the present invention in use on various undersink water supply and P-trap drain assemblies. Specifically, FIG. 2 shows a sink basin 50 having a conventional P-trap drain 52 and water supply angle valves 54. FIG. 3, on the other hand, shows a basin 56 which is connected to a conventional P-trap drain 58 through an offset grid drain 60. As shown in FIG. 3, the offset grid drain 60 moves the P-trap 58 rearwardly a horizontal distance D from the front of the basin 56 as opposed to FIG. 2 where only a P-trap drain 52 is used without an offset grid drain.

Figure 4:
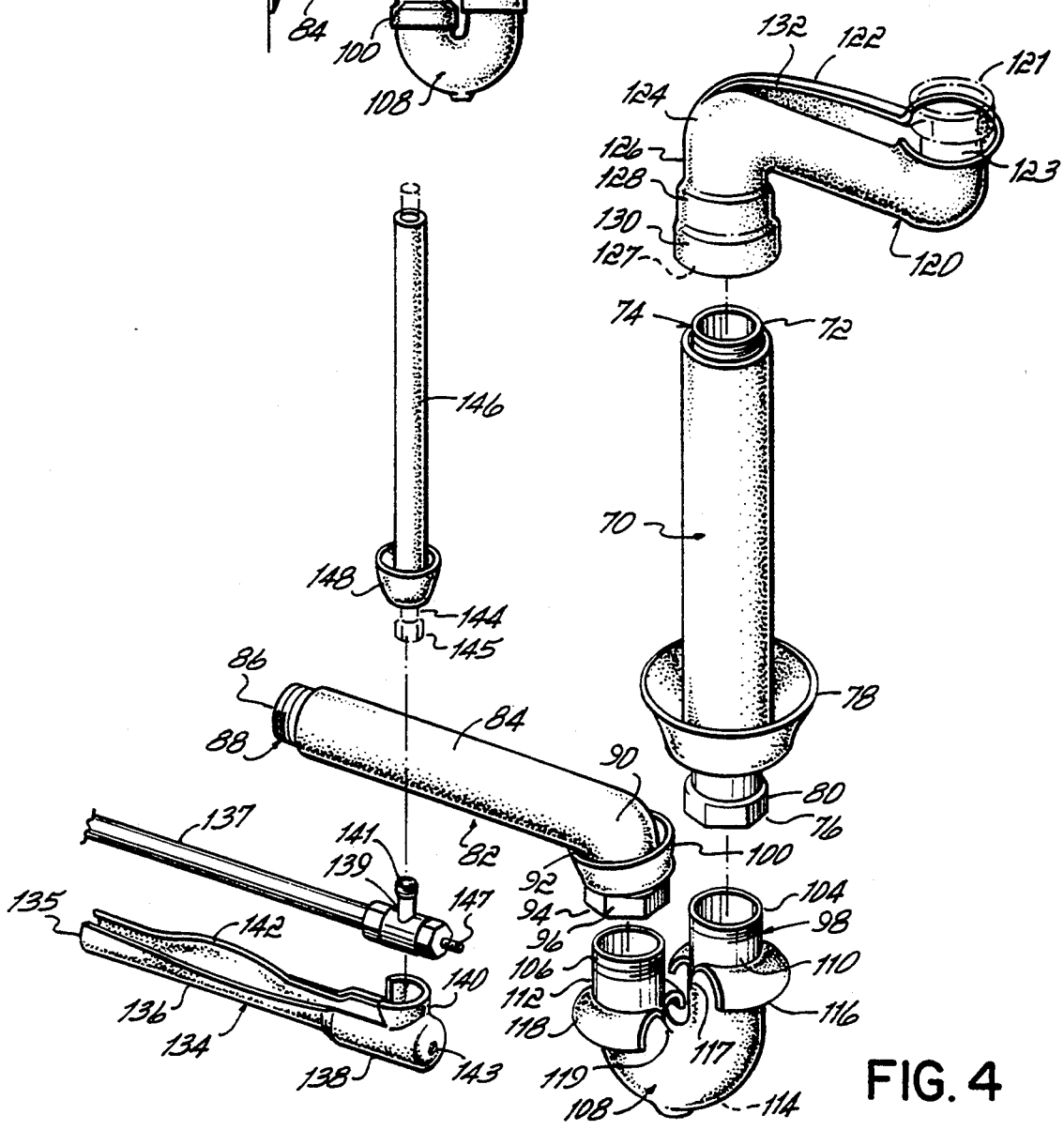
FIG. 4 is a disassembled perspective view of the present invention installed around various pipe sections.
Figure 5:
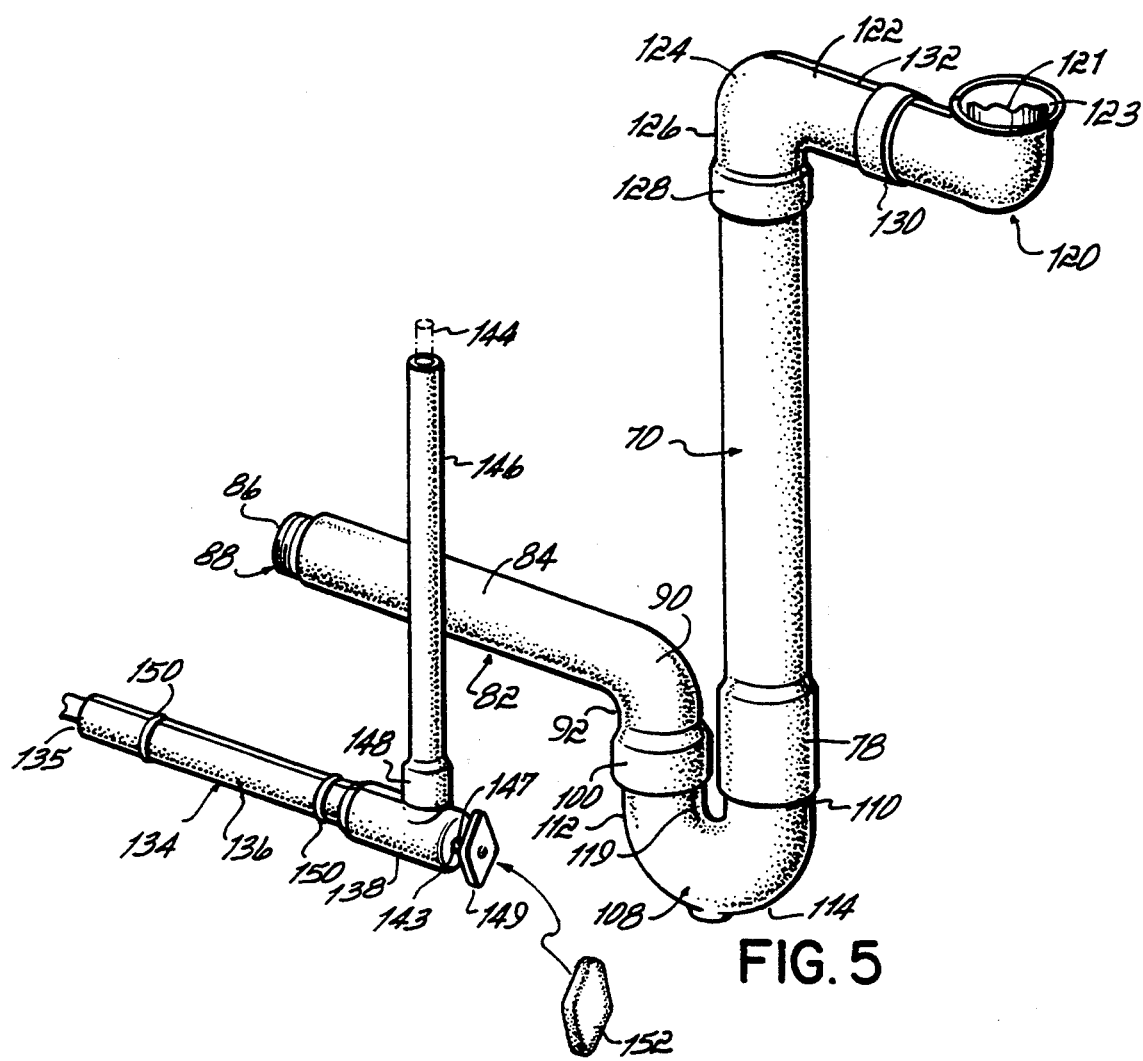
FIG. 5 is a front perspective view of the complete invention around the assembled drain and water supplying piping.

FIGS. 3, 4, and 5 show views of the present invention as it is installed over the various P-trap and water supply pipe sections of an undersink piping assembly. The cover of the present invention includes a straight piece 70 which is configured to have an elongated cylindrical tubular body to cover the straight pipe section of the P-trap. Cover piece 70 extends from proximate the upper end 72 of pipe 74 and approximately the entire length of pipe 74 to proximate lower end 76 of pipe 74. It should be understood that pipe section 74 extending down from a sink drain may deviate from being perfectly straight, and cover piece 70 may be configured to cover such a pipe without deviating from the scope of the present invention. Integral with the cover piece 70 at the lower end thereof is an integral, flexible collar 78. Flexible collar 78 is preferably of a larger diameter than the rest of cover piece 70 and is bendable and configured to be folded upwardly and back along the length of cover piece 70 as shown in FIG. 4 when cover piece 70 is placed over pipe section 74. The cover piece 70 is whole and unslit along its length and is slid over pipe section 74. As such, cover piece 70 generally provides complete coverage of pipe section 74. When installation of the cover pieces and assembly of the P-trap is complete, collar 78 is folded down over pipe nut 80 as will be described hereinbelow in greater detail and as is shown in FIG. 5.

The cover of the invention further includes an L-shaped cover piece 82 which is configured to be placed over the P-trap L-shaped pipe section 88 extending from the trap section 24 to the wall 29. L-shaped cover piece 82 has a generally elongated cylindrical tubular body 84 which extends from the wall end 86 of L-shaped pipe section 88 to a curve section 90 at the opposite end 94. The curve 90 of cover piece 82 is approximately 90° to from the L-shape and a short portion 92 extends downwardly from the curve 90 to the end 94 of L-shaped pipe section 88. The wall end 86 of pipe section 88 is connected to the internal plumbing (not shown) of the structure which lies behind the wall 29 (see FIGS. 1, 2, and 3). A pipe nut 96 is affixed to the end 94 of L-shaped pipe trap section 88 for fastening pipe section 88 to the J-shaped pipe section 98. Integral with the short portion 92 of cover piece 82 is a flexible collar 100 which may be folded back along short portion 92 away from nut 96 during installation of piece 82. Similar to collar 78, collar 100 is preferably dimension larger than body and short portion 92 and flexible to fold forward to cover nut 96 after assembly of the P-trap drain and the invention has been completed as described further below (See FIG. 5). The J-shaped trap section 98 has threaded portions on the ends 104, 106 thereof onto which nuts 80 and 96 are screwed, respectively, to secure the P-trap drain pieces together into a completed P-trap drain assembly as shown in FIGS. 1, 2, 3, and 5. As with cover piece 70, the L-shaped cover piece 82 is designed to cover the generally L-shaped pipe section 86 and may deviate from an exact L-shape without deviating from the scope of the invention.

J-shaped trap pipe section 98 is covered by the generally J-shaped cover piece 108 of the invention. J-shaped cover piece 108 has two generally parallel straight sections 110, 112 and a 180° bend 114 so as to adequately cover the J-shaped pipe section 98. J-shaped cover piece 108 has flexible collars 116, 118 proximate ends 104, 106, respectively which roll back along the straight sections 110, 112 respectively when the cover piece 108 is installed onto the J-shaped pipe section 98. Piece 108 is installed over pipe section 98 and the collars 116, 118 are folded back along sections 110, 112 as shown in FIG. 4. When the collars 116, 118 are folded back and downwardly, the threads of pipe ends 104, 106 are exposed to receive nuts 80 and 96, respectively so that the various pipe sections may be assembled together. The collars 116, 118 of cover piece 108 are preferably dimensioned larger than the end portions 104, 106.

The cover piece 108 in one embodiment of the invention has longitudinal slits 117 and 119 on the lengths of sections 110 and 112, respectively. The slits 117, 119 extend downwardly from the collared ends of piece 108 to proximate the bend 114 and allow sections 110, 112 to be spread or split apart for easier installation of cover piece 108 over the pipe section 98. In an alternative embodiment of the invention, the cover piece 108 is molded onto J-shaped pipe section 98 such as by dipping the J-shaped pipe section 98 into softened cover material and allowing the cover material to solidify over the pipe section. With the molded embodiment, the longitudinal slits might not be necessary for the installation of piece 108 because it is already on the pipe section 98.

When the pipes 72, 88, and 98 are assembled together and nuts 80 and 96 are securely fastened to the ends 104, 106 of pipe 98 to complete the P-trap and form a watertight seal at the junctures between the pipe section, the flexible collars 116, 118 of J-shaped cover piece 108 are folded upwardly to cover the juncture between the pipes and to cover the respective pipe nuts 80 and 96. Then, collars 78 and 100 on cover pieces 70 and 82 are folded downwardly over nuts 80 and 96, respectively. As shown in FIG. 5, the opposing collars 78, 116, and 100, 118 form a double overlap of the junctures between the various pipe sections of the assembled P-trap drain. The double overlapping collars provide a continuous coverage of the P-trap drain assembly from the wall through the trap section and upwardly to the sink. Furthermore, the double overlapping collars cover a portion of the slits 117, 119 and close the slits to secure cover piece 108 to the pipe section and prevent dirt or bacteria from being trapped in an open slit. FIG. 2 shows a covered P-trap assembly using the various cover pieces 70, 82, and 108 of the present invention. The invention, by providing a complete insulative cover over the P-trap assembly, protects a person contacting the undersink piping from abrasions and burns.

In accordance with the present invention, the folding of the opposing flexible collars during assembly might be reversed, such as by having the flexible collars 116 and 118 of section 108 overlap collars 78 and 100, respectively. However, it is desirable to have the upper collars 78, 100 overlap the lower collars 116, 118 in order to prevent an outer upturned collar which may collect dirt and other bacteria beneath the sink. As may be seen in FIGS. 2, 3, and 5, the completely assembly P-trap cover assembly of the present invention provides an aesthetically pleasing and smooth drain piping cover which completely covers and insulates the P-trap drain piping to prevent injury to persons that come in contact with the undersink piping.

As shown in FIG. 1 and discussed above, the undersink drain piping may include an offset grid drain piece 35 which moves the P-trap piping assembly rearwardly a distance D from the front of sink basin 56 to provide more undersink room for a person in a wheelchair to access the sink. To cover the offset grid drain 35 (show in FIG. 4 in phantom with reference number 121), the invention includes an offset grid drain cover piece 120 as shown in FIG. 4 which includes a generally horizontal long portion 122, 90° curve 124 and a shorter vertical portion 126. While a 90° curve in an offset grid drain is typical, other angles may be utilized and the cover piece 120 may be configured to match a particular drain without deviating from the scope of the present invention. An opening 127 is defined at one end of the short portion 126 while the long portion 122 bends at approximately 90° at the end opposite curve 124 to define an opening 123 that has an axis generally parallel the longitudinal axis of the short portion 126 and generally perpendicular the long portion 122. Opening 123 is configured and dimensioned to lie generally against the bottom of a sink covering the drain opening while cover piece opening 127 is oriented and dimensioned to receive the upper end of the straight cover piece 70. When assembled, the offset grid drain cover piece 120 meets straight cover piece 70 to form a completed cover over the pipe juncture between the straight pipe 74 and offset grid drain 121 (See FIGS. 3, 4, and 5).

The shorter vertical portion 126 of offset grid drain cover piece 120 includes a flexible collar 128 and a detachable securing band 130 at the lower end thereof which define opening 127. Collar 128 and band 130 are flexible to be folded back along vertical portion 126 when the cover piece 120 is installed over grid drain 121 (See FIG. 4A). As further discussed hereinbelow, band 130 may be supplied as a separate piece as opposed to being detachably fixed to the flexible collar 128. To facilitate easy installation of cover piece 120 over grid drain 123, a longitudinal slit 132 extends along horizontal portion 122 from opening 121 to preferably curve 124. In use, cover 120 is split or spread apart along the horizontal slit 132 and placed around the offset grid drain 121 as shown in FIG. 4.

Figure 4A:
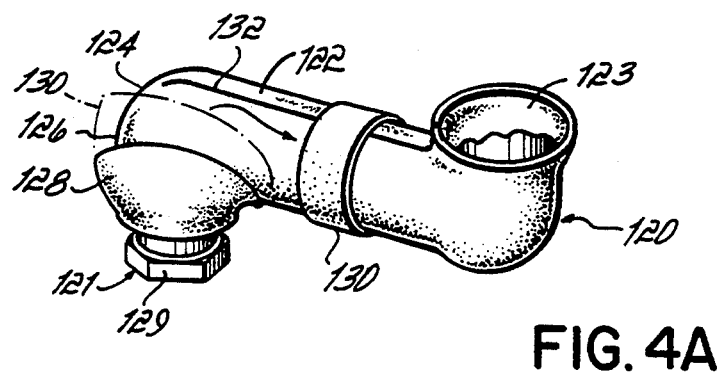
FIG. 4A is a perspective view of a cover of the present invention shown around an offset grid drain.

Offset grid drain 121 and straight pipe section 74 of the P-trap are secured together during installation by a nut or other mechanism such as pipe nut 129 (See FIG. 4A). Once the juncture between pipe sections 74 and 121 is completed and sealed in a watertight seal, flexible collar 128 is folded downwardly to cover nut 129 and the juncture between pipe section 74 and drain 121. However, as illustrated in FIG. 4A, prior to folding collar 128 down, detachable band 130 is severed from collar 128 and is slid up along portion 126, over curve 124, and onto horizontal portion 122, partially overlapping horizontal slit 132 and holding cover piece 120 closed at slit 132. This further secures cover piece 120 to the offset grid drain 121. In an alternative embodiment, band 130 may be formed and used as a separate piece. The separate band would then be slid over cover piece 120 to close slit 132 when the cover piece is applied. A separate band would function similar to the detachable band shown in FIG. 4A. FIG. 4A shows band 130 in phantom before it has been detached from folded collar 128 and shows it again after it has been moved to encircle portion 122 and hold cover piece 120 together at slit 132. Band 130 may be detached from flexible collar 128 by being cut, such as with a knife, or the band 130 may include perforations around the point of connection 131 to collar 128. Such perforations would allow easier severance such as with a less sharp instrument or even by hand. Cover piece 120 completely covers the offset grid drain 121 and is secured thereon through the use of band 130.

When the P-trap assembly including offset grid drain 121, is complete, the flexible collar 128 is folded downwardly over the junction between the grid drain 121 and pipe section 74 to overlap the upper end of the straight cover piece 70 and provide complete coverage and insulation at the juncture between the two pipe sections. Flexible collar 128 extends downwardly to prevent dirt and other bacteria from being trapped under the collar. FIG. 5 shows the installed cover piece 120 of the present invention which is secured to the offset grid drain with band 130. As may be appreciated, the use of an offset grid drain 121 moves the P-trap rearwardly from the front of the sink basin (See FIG. 3). Accordingly, when using the present invention with undersink piping having an offset grid drain, the length of L-shaped cover piece 82 may need to be reduced. This may be done by either manufacturing a shorter piece or cutting a longer L-shaped piece down to size prior to installation in the field.

Convention undersink piping further includes water supply pipes and valves commonly referred to as water angle valves. These water angle valves and associated piping must also be covered in compliance with various regulations, especially the hot water angle valve and piping which may scald a person if contacted uncovered. As shown in FIG. 1, typical water angle valves 31, 33 include a supply line 19, a valve 21 connected to the supply line, and a faucet line 23 which connects from the valve 21 to the sink plumbing such as faucet 14. The faucet line 23, when valve 21 is open, delivers water to the faucet 14 as determined by faucet valves 16, 18. Valves 21, 21 includes a valve handle 25 which is rotated to open and close valve 21 and deliver water to the faucet line 23, 23 and faucet 14.

The present invention as shown in FIGS. 3, 4, and 5 includes water angle valve covers for the hot and cold water angle valves. Since the angle valves are generally identical, the cover pieces are generally identical for the hot and cold water angle valves. Referring to FIG. 4, the angle valve cover comprises an elongated first piece 134 which is generally cylindrical in shape to fit over the supply line 137 and valve 139. The first piece 134 includes an elongated pipe portion 136 which is integrally attached with a valve portion 138. The valve portion 138 is dimensioned larger than the pipe portion to fit over valve 139. A vertical projection 140 extends generally perpendicular to the valve portion 138 to cover a vertical extension 141 extending from valve 139 in FIG. 4. The cover piece 134 has a longitudinal slit 142 from one end 135, along line portion 136 and part of portion 138, and up to and including one side of the projection 140. As shown in FIG. 4, longitudinal slit 142 allows piece 134 to be split or spread apart along most of its length to be installed over supply line 137 and valve 139. As further shown in FIG. 4, the extension 141 of valve 139 is connected to a faucet line 144, such as by using a pipe nut 145. The projection 140 on cover piece 134 extends over valve extension 141 when piece 134 is placed over line 137 and valve 139.

The invention further includes a second elongated cover piece 146 which is placed over faucet line 144 when the water angle valves are installed. At the end of cover piece 146, proximate pipe nut 145 and the juncture where line 144 meets the valve projection 141, cover piece 146 includes an integral, flexible collar 148. Collar 148 is preferably larger in diameter than the rest of cover piece 146 and is folded upwardly along cover piece 146 during installation. After the cover 134 has been placed over line 137 and valve 139, then cover 146 is placed over line 144, and line 144 is attached to valve 139. Next, flexible collar 148 is folded downwardly over nut 145, extension 141 and projection 140 to provide a complete cover over the juncture between valve 139 and faucet line 144. The downwardly extending collar 148 prevents dirt and bacteria from settling in the collar and being trapped thereunder. Collar 148 serves to hold the cover piece 134 together onto pipe 137 and valve 139 by holding the projection 140 together over a portion of the slit 142. Thus collar 138 secures cover piece 134 of the invention to line 137 and valve 139. To further secure cover piece 134, one or more external fastening wraps 150 might be utilized over slit 142 to hold cover piece 134 together along the slit (See FIG. 5).

Cover piece 134 further includes an opening or aperture 143 at the end of the valve portion 138. As shown in FIG. 4, the valve 139 of the water angle valve piping assembly includes a stem 145. Stem 147 attaches to a valve handle 149 (See FIG. 5) which is rotated to open and close the valve 139. During installation of cover piece 134, the stem 147 is inserted through aperture 143 and the handle 149 attached thereto. In one embodiment of the invention, a valve handle piece 152 is included which is configured to cover valve handle 147 and is placed thereon to complete the cover assembly.

Therefore, as shown in FIG. 5, the present invention may be easily and quickly installed so that, when fully assembled, it provides an aesthetically pleasing cover for undersink piping which completely covers and insulates the undersink drain piping and water supply piping. The present invention may be manufactured utilizing Vinyl Plastisol from Plastomeric of New Baltimore, Ohio which provides adequate insulation and cushioning to prevent burns or abrasions from contact with the pipes but allows flexing of the flexible collars. The material used to manufacture the cover pieces may be injected into a die corresponding to a particular piece when in a flowing state and then allowed to harden to a set form. Accordingly, other materials might be utilized without deviating from the scope of the invention.

The cover of the present invention has minimal, exposed cavities for trapping dirt or other bacteria, and preferably, the flexible collars of the present invention are utilized so that when fully assembled, the cover assembly includes a series of downwardly turned overlap collars which prevent dirt and bacteria from settling by gravity at the pipe junctures. The cover of the present invention is simple to install, requiring very few tools, very little time and little or no external fasteners.

The flexible collars on the various cover pieces allow quick and easy assembly and use of the invention by exposing pipe junctures and pipe nuts for further manipulation during assembly of a P-trap drain and application of the invention. Furthermore, since the flexible collars may be rolled back to expose the pipe junctures, the various cover pieces may be first placed on their respective pipe sections and the pipe sections assembled into a complete P-trap. This amounts to a substantial savings in time when using the invention and assembling a P-trap drain. Additionally, since the flexible collars allow individual cover pieces of the invention to be applied to the respective pipe sections prior to assembly of the P-trap, the cover sections require little or no additional securement to the pipe sections after installation. For example, in one embodiment of the invention, the L-shaped and straight cover pieces 70, 82 are essentially whole, unslit, tubular pieces which, because of their flexible collars, may be slid over the straight and L-shaped pipe sections 88, 72 prior to assembly of the P-trap. Once installed and the collars folded down, the straight and L-shaped cover pieces 70, 82 completely cover their respective pipe sections 88, 72 and are secure thereon without need for additional securing mechanisms. Furthermore, when the J-shaped cover piece 108 is slit partially therealong from both ends and generally through the flexible collars, there might be a tendency for the J-shaped cover piece to be loose. However, with the present invention, once the P-trap has been assembled and all of the cover pieces of the present invention installed with the flexible collars rolled down to cover the pipe nuts and pipe junctures, the overlapping collars from the straight and L-shaped pieces cover the collars on the J-shaped piece and portions of the slit J-shaped piece to hold the J-shaped cover piece in place and the collars of the J-shaped piece securely wrapped around the pipe section.

While the present invention has been illustrated by the description of the embodiments thereof, and while the embodiments have been described in considerable detail, it is not the intention of applicant to restrict or in any way limit the scope of the appended claims to such detail. Additional advantages and modifications will readily appear to those skilled in the art. For example, the cover pieces might be made using a more rigid material and the collars made to be flexible using a score or like construction on the inside of the pieces to weaken the wall of the pieces proximate the collars. Therefore, the invention in its broader aspects is not limited to the specific details, representative apparatus and method, and illustrative examples shown and described. Accordingly, departures may be made from such details without departure from the spirit or scope of applicant's general inventive concept.

What is claimed is:

1. An insulative cover for a P-trap drain piping assembly located under a sink including multiple pipe sections, the cover comprising:
   a J-shaped piece with two generally parallel end portions;
   a straight piece with opposite ends, the straight piece having a flexible collar at one end thereof which is capable of being rolled back along the straight piece when the piece is placed over a pipe section;
   an L-shaped piece with opposite ends, the L-shaped piece having a flexible collar at one end thereof which is capable of being rolled back along the L-shaped piece when the piece is placed over a pipe section; and
   whereby the various cover pieces may be placed over the corresponding pipe sections of a disassembled P-trap drain assembly with the collars rolled back so as not to interfere when the pipe sections are connected together and the collars then rolled over the junctures between adjacent pipe sections to completely insulate and cover the assembled P-trap drain.

2. The cover of claim 1 wherein the J-shaped piece has a flexible collar at one end thereof which is capable of being rolled back along the end portion when the J-shaped piece is placed over a pipe section, whereby the collar is rolled back during connection of the pipes and rolled down proximate the pipe juncture of the assembled P-trap drain.

3. The cover of claim 1 wherein the J-shaped piece has a longitudinal slit along part of at least one of the end portions to facilitate placing the J-shaped piece over a pipe section.

4. The cover of claim 3 wherein the J-shaped piece has a longitudinal slit along part of both end portions.

5. The cover of claim 1 wherein the collar of at least one of the straight piece and the L-shaped piece is dimensioned in length to completely cover, when rolled down, a securing nut used to attach two pipe sections together at juncture between the pipes when assembling the P-trap drain.

6. The cover of claim 5 wherein the collars of both of said L-shaped and straight pieces are dimensioned to completely cover the securing nuts of an assembled P-trap drain when the collars are rolled down proximate junctures between the assembled pipe sections.

7. The cover of claim 2 wherein the collar on the J-shaped piece cooperates with the collar on one of the straight and the L-shaped pieces to provide complete collar coverage over a juncture between two adjacent pipe sections when the collars are both rolled down proximate the juncture after the pipe sections have been assembled.

8. The cover of claim 7 wherein the J-shaped piece has two flexible collars, one at each end portion, the collars of the J-shaped piece cooperating with the collars on both the straight and L-shaped pieces to complete dual collar coverage of the junctures between various adjacent pipe structures when the collars are rolled down proximate the junctures.

9. The cover of claim 7 wherein the collar on one of the straight and L-shaped pieces is dimensioned larger than the collar on the J-shaped piece such that it may be rolled to overlap the collar on the J-shaped piece and provide dual collar coverage of the junctures between adjacent pipes.

10. The cover of claim 8 wherein the collars on the straight and L-shaped pieces are dimensioned larger than the collars on the J-shaped piece such that the collars on the L-shaped and straight pieces overlap the collars on the J-shaped piece and provide dual collar coverage of the junctures between adjacent pipes.

11. The cover of claim 2 wherein the collar on the J-shaped piece is dimensioned to completely cover, when rolled down, a securing nut used to attached two pipe sections together at a juncture between the pipes when assembling the P-trap drain.

12. The cover of claim 1 wherein the J-shaped piece has a flexible collar at both end portions thereof.

13. An insulative cover for a P-trap drain piping assembly located under a sink including multiple pipe sections, the cover comprising:
at least two cover pieces with opposite ends configured to fit over the various pipe sections of a P-trap drain;
a flexible collar at one end of one of the cover pieces, said flexible collar flexing to be folded back along the cover piece when two pipe sections are being assembled thus exposing the juncture between the pipe sections and facilitating assembly and further flexing to be folded forward to cover the juncture between the pipe sections when assembled into a complete P-trap drain;
whereby the cover pieces and flexible collars cooperate to provide a complete continuous cover over a pipe juncture on the P-trap drain.

14. An insulative cover for undersink water supply piping with various sections including a supply a supply line, a valve, a valve handle to open and close the valve, and a faucet line, said cover comprising:
a first piece to cover the supply line and valve, said first piece having an elongated body with a line portion to cover the supply line and an integral valve portion generally co-axially with said line portion at one end thereof to cover the valve; and
a second piece to slide over the faucet line and connect with the first piece, said second piece having an elongated body with a flexible collar at one end thereof which is folded back when the second piece is placed over a faucet line, said flexible collar dimensioned such that it may be folded forward to partially surround a juncture between the valve and faucet line and connect the first and second pieces together to form a continuous cover on the assembled water supply piping.

15. The cover of claim 14 wherein the first piece body has a longitudinal slit thereon so that the body may be spread at the slit to fit over the supply line and valve.

16. The cover of claim 15 wherein the valve portion includes a projection extending generally perpendicular to the longitudinal axis of the first piece body and the slit extends from one end of the first piece body to the projection and along one side of said projection, whereby the flexible collar of the second piece surrounds the slit projection to hold it together and secure said first piece to the supply line and valve.

17. The cover of claim 14 wherein the second piece is unslit and is slid over a faucet line so that the second piece does not require additional securing means to stay secure on the faucet line.

18. The cover of claim 14 wherein the valve portion of said first piece has an aperture at one end thereof so that a valve stem may protrude from the first piece whereby a valve handle to turn the valve on and off may be placed on the valve stem.

19. The cover of claim 14 further comprising a valve handle cover piece configured to cover a valve handle.

20. An insulative cover for an offset grid drain comprising:
a unitary body with openings at opposite ends, a longitudinal slit extending from an end opening along a portion of the body to allow the body to be partially spread along said slit and placed over an offset grid drain;
a band configured to slide along said body to said slit portion to encircle part of the slit portion and hold said body together at the slit;
whereby the cover may be placed on an offset grid drain and secured in place by sliding the band over the body.

21. The cover of claim 20 wherein said cover body includes a first portion and a second portion, said first portion integrated with said second portion through a curve in the body.

22. The cover of claim 21 wherein said slit extends from an end opening and along said first portion whereby the first portion may be spread along the slit for easier installation over an offset grid drain.

23. The cover of claim 21 wherein the curve is generally 90° so that the second portion extends generally perpendicular to said first portion.

24. The insulative cover of claim 20 wherein said band is dimensioned larger than said body so that said band is easily slid over the body to the longitudinal slit.

25. The insulative cover of claim 20 further including a flexible collar at one end of said body, said collar co-axial with a portion of the body to be folded back along the body portion during installation of said cover and subsequently folded forward, whereby the collar extends over a juncture between an offset grid drain and another adjacent pipe section having a cover to connect one end of the offset grid drain cover to the adjacent pipe cover.

26. The cover of claim 20 wherein the band is removably fixed to an end of said body and detachable from said end to be slid over the slit portion of the body.

27. The cover of claim 26 further including a flexible collar at one end of said body, said collar coaxial with a portion of the body to be folded back along the body portion during installation of said cover, and subsequently folded forward, thereby the collar extends over a juncture between an offset grid drain and another adjacent pipe section having a cover to connect one end of the offset grid drain cover to the adjacent pipe cover.

28. The cover of claim 27 wherein the band is removably attached to said flexible collar and is severable therefrom to be slid over the cover body.

29. An insulative cover for a P-trap drain piping assembly located under a sink including multiple pipe sections, the cover comprising:
   a straight piece with opposite ends configured to fit over a pipe section of a P-trap;
   an L-shaped piece with opposite ends configured to fit over another pipe section of a P-trap; and
   a J-shaped piece with two generally parallel end portions configured to fit over another pipe section of a P-trap, the J-shaped piece having a flexible collar at one end thereof which is capable of being rolled back along the end portion when the J-shaped piece is placed over a pipe section of a P-trap;
   whereby the various cover pieces may be placed over pipe sections of a disassembled P-trap drain with the collar of the J-shaped piece rolled back so as not to interfere when the pipe sections are connected together and the collar then rolled over the junctures between adjacent pipe sections to insulate and cover the assembled P-trap drain.

30. The cover of claim 29 wherein the J-shaped piece has a flexible collar at both end portions thereof.

31. The cover of claim 29, the J-shaped piece being molded over the corresponding pipe section of the P-trap.

32. A method of insulating undersink piping including a P-trap drain assembly with multiple shaped pipe sections, the method comprising:
   providing shaped cover pieces of material, placing said shaped cover pieces of material around separate, shaped pipe sections of a P-trap assembly, at least one of said shaped cover pieces having a flexible collar at one end thereof;
   folding back the flexible collar of the shaped cover piece;
   assembling pipe sections having cover pieces thereon together into a P-trap assembly with said folded back flexible collar adjacent a juncture between two pipe sections;
   folding said flexible collar forward to cover part of said juncture when the pipe sections are secured together;
   whereby to provide an insulative covering of the P-trap assembly at the pipe juncture.

33. The method of claim 32 wherein the shaped cover pieces comprise an L-shaped piece, a straight piece and a J-shaped piece, the L-shaped piece and straight piece each having a flexible collar at one end thereof, the method further comprising:
   folding back the collars of the straight and L-shaped pieces when the insulative pieces are placed on the corresponding pipe sections of the P-trap;
   assembling the pipe sections together into a P-trap assembly such that the collars of the straight and L-shaped pieces are adjacent pipe junctures; and
   folding the flexible collars of the pieces forward to cover part of said pipe junctures;
   whereby to provide a complete insulative covering at both pipe junctures between the L-shaped, straight and J-shaped pieces of a P-trap drain.

34. The method of claim 32 wherein the shaped cover pieces comprise a J-shaped piece having a flexible collar at one end thereof, the method further comprising:
   folding back the flexible collar of the J-shaped piece when the insulative pieces are placed on the corresponding sections;
   assembling the pipe sections together into a P-trap assembly such that the collar of the J-shaped piece is adjacent a pipe juncture; and
   folding the flexible collar of the J-shaped piece forward to cover part of said juncture.

35. The method of claim 33 wherein the J-shaped piece has a flexible collar at an end thereof, the flexible collar on the J-shaped piece and a flexible collar on one of the L-shaped and straight pieces opposing one another adjacent the same pipe juncture when the pipe sections are assembled into a P-trap, the method further comprising:
   folding back the flexible collar of the J-shaped piece when the J-shaped piece is placed on the corresponding pipe section; and
   folding the opposing collars forward over the pipe juncture such that the opposing collars cooperate to completely cover the juncture.

36. The method of claim 35 wherein the J-shaped piece has flexible collar at each end thereof, the method further comprising:
   folding both of the collars on the J-shaped piece back when the piece is placed on the respective pipe section;
   assembling the pipe sections together such that the collars on the J-shaped are adjacent the pipe junctures and oppose the collars on the L-shaped and straight pieces; and
   folding all of the collars forward over the pipe junctures such that the opposing collars cooperate to completely cover the junctures.

37. The method of claim 35 wherein the collars are configured to completely cover the pipe junctures when folded forward, the method further comprising folding the collar on one of the L-shaped and straight pieces and the collar on the J-shaped piece, so that the collars cooperate to provide double coverage of the juncture.

38. The method of claim 36 wherein the collars are configured to completely cover the pipe junctures when folded forward, the method further comprising folding the collars on the L-shaped and straight pieces and the collars on the J-shaped piece, so that the collars cooperate to provide double coverage of the juncture.

39. The method of claim 37 further comprising folding the collar on one of the L-shaped and straight pieces to overlap the collar on the J-shaped piece.

40. The method of claim 38 further comprising folding the collars on the L-shaped and straight pieces to overlap the collars on the J-shaped piece.

41. The method of claim 33 wherein the J-shaped piece is slit from at least one end, the method further comprising:
   spreading the J-shaped piece at the slit when placing said J-shaped piece over the corresponding pipe section of the P-trap.

42. The method of claim 33 wherein the J-shaped piece is pre-molded onto the corresponding pipe section, the method further comprising:
   folding the collars forward over the pipe junctures to cover a portion of said molded J-piece.

43. A method of covering undersink water supply piping including a supply line, valve and faucet line, the method comprising:
   providing shaped cover pieces of material, said shaped cover pieces including a first piece to cover the supply line and valve having an elongated body and an opening adjacent one end of said body, the body of the first piece being slit lengthwise from one end, and a second piece to cover the faucet line having an elongated body and a flexible collar at one end thereof;
   spreading said first piece along said slit to place the first piece over a supply line and valve;
   placing the second piece over a faucet line and folding said second piece flexible collar back;
   securing the faucet line to the valve through said first piece opening such that the collar of the second piece is adjacent said opening; and
   folding the collar down to provide continuous covering of the water supply piping.

44. The method of claim 43 further comprising:
   placing a securing band around said first piece spaced from said opening to further secure the first piece to the supply line and valve.

45. The method of claim 43 further comprising:
   supplying a first and second piece for each of the hot water and cold water supply piping;
   placing the first and second pieces on a supply line and valve and on a faucet line, respectively, of hot and cold water supply piping; and
   folding the flexible collars of both said second pieces down toward the openings of the hot and cold water first pieces to provide a complete covering of the hot and cold water supply piping.

46. The method of claim 43 wherein said first piece has an aperture at one end co-axial with the elongated body, the method further comprising:
   inserting a valve stem from the valve through the aperture when said first piece is placed around the supply line and valve;
   attaching a valve handle to said stem to turn the valve on and off without removing said first piece.

47. The method of claim 46 further comprising:
   providing a cover piece configured to fit over a valve handle;
   placing said handle cover piece over the valve handle after the stem is inserted through the aperture and the handle is attached to the valve.

48. A method of insulating of offset grid drain which attaches to one end of the straight pipe section of a conventional P-trap drain assembly, the method comprising:
   providing a shaped cover piece of material configured to fit over an offset grid drain and having opposite ends, said cover piece having a longitudinal slit thereon, and providing a band configured to fit around the cover piece;
   spreading the cover piece along the slit and placing said piece over an offset grid drain;
   placing the band over the piece at one end and moving the band over the cover piece to surround a portion of the piece and extend across said for slit securing the cover piece to the offset grid drain.

49. The method of claim 48 wherein the cover piece further includes a flexible collar at one end thereof, the method further comprising:
   folding the collar back along the cover piece when placing the piece over the offset grid drain;
   securing the grid drain to a conventional P-trap drain assembly straight piece;
   rolling the collar forward over a juncture between the grid drain and straight piece;
   whereby to provide a complete insulative cover over the juncture.

50. The method of claim 48 wherein the band is removably attached to an end of said cover piece, the method further comprising:
   detaching said band from said cover piece; and moving the band over said piece to extend across the slit and secure the piece to the offset grid drain.

51. The method of claim 49 wherein the band is removably attached to said flexible collar, the method further comprising:
   folding the collar and band back along the cover piece when placing the piece over the offset grid drain;
   detaching said band and placing it over the longitudinal slit in the cover piece;
   rolling the collar forward after the band has been detached.

* * * * *

UNITED STATES PATENT AND TRADEMARK OFFICE
CERTIFICATE OF CORRECTION

PATENT NO. : 5,341,830

DATED : August 30, 1994

INVENTOR(S) : Helmsderfer et al.

It is certified that error appears in the above-identified patent and that said Letters Patent is hereby corrected as shown below:

Column 4, Line 44, "the" should be replaced with --then--.

Column 7, Line 36, "from" should be replaced with --form--.

Claim 14, Column 14, Line 2, the duplicated phrase "a supply" should be deleted.

Claim 36, Column 16, Line 43, "has flexible" should be replaced with --has a flexible--.

Signed and Sealed this

Fourteenth Day of February, 1995

BRUCE LEHMAN

*Attest:*

*Attesting Officer*     *Commissioner of Patents and Trademarks*